US010997676B2

(12) United States Patent
Treadwell et al.

(10) Patent No.: US 10,997,676 B2
(45) Date of Patent: May 4, 2021

(54) AUTOMATED VALUATION MODEL USING ORDINAL VARIABLES SUCH AS CONDITION AND QUALITY VARIABLES

(75) Inventors: John Treadwell, Washington, DC (US); Lisa Dorsey, Arlington, VA (US); Patria S. Kunde, McLean, VA (US); Eric Rosenblatt, Derwood, MD (US); Jesse Staal, Arlington, VA (US)

(73) Assignee: Fannie Mae, Washington, DC (US)

( * ) Notice: Subject to any disclaimer, the term of this patent is extended or adjusted under 35 U.S.C. 154(b) by 26 days.

(21) Appl. No.: 13/418,173

(22) Filed: Mar. 12, 2012

(65) Prior Publication Data
US 2013/0238512 A1  Sep. 12, 2013

(51) Int. Cl.
*G06Q 50/16* (2012.01)
*G06Q 30/02* (2012.01)

(52) U.S. Cl.
CPC ......... *G06Q 50/16* (2013.01); *G06Q 30/0206* (2013.01)

(58) Field of Classification Search
CPC .... G06Q 10/10; G06Q 30/02; G06Q 30/0278; G06Q 50/16
USPC ....................................................... 705/306
See application file for complete search history.

(56) References Cited

U.S. PATENT DOCUMENTS

| | | | |
|---|---|---|---|
| 5,361,201 A | 11/1994 | Jost et al. | |
| 5,966,700 A | 10/1999 | Gould et al. | |
| 6,178,406 B1* | 1/2001 | Cheetham et al. | 705/7.34 |
| 7,099,843 B1 | 8/2006 | Cassidy et al. | |
| 7,289,965 B1 | 10/2007 | Bradley et al. | |
| 7,340,431 B1 | 3/2008 | McManus et al. | |
| 7,451,095 B1 | 11/2008 | Bradley et al. | |
| 7,509,261 B1 | 3/2009 | McManus et al. | |
| 7,593,890 B1 | 9/2009 | Bradley et al. | |
| 7,647,272 B1 | 1/2010 | Muren | |
| 7,693,764 B1 | 4/2010 | Gordon et al. | |

(Continued)

OTHER PUBLICATIONS

"Value of Ocean Proximity on Barrier Island Houses," Appraisal Journal, Published Apr. 1, 2000.*

(Continued)

*Primary Examiner* — Aryan E Weisenfeld
(74) *Attorney, Agent, or Firm* — Michael Best and Friedrich LLP (57) ABSTRACT

An automated valuation model that uses condition and quality variables. In response to user queries, the model ranks and displays comparables for a subject property. The comparables are selected based on their similarity to the subject. Data on quality and condition of properties is incorporated into the model and corresponding comparable assessments. For example, the quality and condition inputs may be used in a hedonic adjustment factor model, comparable selection exclusion rules, economic distance calculations, and adjustments for differences between the subject and comparables at comparable selection stage. The comparables may be displayed in ranked order based on the calculated similarities between the properties, with indications of the quality and condition categories, to provide an overall assessment of the comparables as well as displayable indications of the underlying quality and condition categories and related information. The model may also use other ordinal variables and may perform any type of valuation.

17 Claims, 7 Drawing Sheets

(56) References Cited

U.S. PATENT DOCUMENTS

| | | | |
|---|---|---|---|
| 7,711,574 B1 | 5/2010 | Bradley et al. | |
| 7,788,186 B1 * | 8/2010 | An et al. | 705/306 |
| 7,792,742 B1 | 9/2010 | Thomas et al. | |
| 7,797,166 B1 | 9/2010 | Bradley et al. | |
| 7,835,919 B1 | 11/2010 | Bradley et al. | |
| 7,882,025 B1 | 2/2011 | Seal et al. | |
| 7,904,381 B1 | 3/2011 | Tatang et al. | |
| 7,941,365 B1 | 5/2011 | Bradley et al. | |
| 7,941,366 B1 | 5/2011 | Bradley et al. | |
| 7,945,510 B1 | 5/2011 | Bradley et al. | |
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 | 10/2011 | Stinson | |
| 8,108,302 B1 | 1/2012 | Bradley et al. | |
| 8,140,421 B1 | 3/2012 | Humphries et al. | |
| 8,195,473 B2 * | 6/2012 | Myr | 705/1.1 |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 2005/0154656 A1 | 7/2005 | Kim et al. | |
| 2005/0154657 A1 | 7/2005 | Kim et al. | |
| 2008/0004893 A1 * | 1/2008 | Graboske | 705/1 |
| 2008/0301064 A1 * | 12/2008 | Burns | 705/400 |
| 2011/0055091 A1 * | 3/2011 | Budlong | 705/313 |
| 2012/0005109 A1 * | 1/2012 | Stinson | 705/306 |

OTHER PUBLICATIONS

Vandell, Kerry D. "Optimal Comparable Selection and Weighting in Real Property Valuation" AREUEA Journal, vol. 19, No. 2, 1991, pp. 213-239.

Gau, George W., et al. "Optimal Comparable Selection and Weighting in Real Property Valuation: An Extension" Journal of the American Real Estate and Urban Economics Association vol. 20, No. 1, 1992, pp. 107-123.

\* cited by examiner

AUTOMATED VALUATION MODEL USING ORDINAL VARIABLES SUCH AS CONDITION AND QUALITY VARIABLES

BACKGROUND OF THE INVENTION

1. Field of the Invention

This application relates to an automated valuation model that accommodates assessment of subject items using one or more ordinal variables.

2. Description of the Related Art

Automated valuation models (AVMs) are now widely used to automatically evaluate properties, such as for assessing the propriety of including comparable properties in an appraisal, determining whether an appraisal value is appropriate, and so forth.

These AVMs accurately evaluate properties based upon objective property characteristics such as the number of bedrooms and the lot size. Property condition and quality are more difficult to assess using an AVM.

What is needed is an AVM that implements accurate identification and adjustment for property condition and quality in an automated fashion.

SUMMARY OF THE INVENTION

An automated valuation model that uses condition and quality variables, or any variable with a judgmental component that has been converted to an ordinal variable. In response to user queries, the model ranks and displays comparables for a subject property. The comparables are selected based on their similarity to the subject. Data on quality and condition of properties is incorporated into the model and corresponding comparable assessments. For example, the quality and condition inputs may be used in a hedonic adjustment factor model, comparable selection exclusion rules, economic distance calculations, and adjustments for differences between the subject and comparables at comparable selection stage. The comparables may be displayed in ranked order based on the calculated similarities between the properties, with indications of the quality and condition categories, to provide an overall assessment of the comparables as well as displayable indications of the underlying quality and condition categories and related information.

The model may also use other ordinal variables, generally, and may perform any type of valuation, whether on property or other subject valuations.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

According to one aspect, an automated valuation model for any subject item, real property or otherwise, uses a regression model that includes at least one ordinal variable.

Although any subject item may be evaluated, in one example the evaluation subject is real property, and the ordinal variable is a quality or condition variable. Specifically, in the regression, the ordinal variable is a quality or condition variable corresponding to the real property, and the dependent variable is price, such that an attribution to the price according to the quality or condition variable is provided by the regression.

Although quality and condition variables are one example of variables that may be ordinal variables in the regression, other ordinal variable examples may be implemented, such as view and location variables.

Continuing with one example, a comparable selection model uses categorical inputs for quality and condition. In response to user queries, the model ranks and displays comparables for a subject property. The comparables are selected based on their similarity to the subject. Data on quality and condition of properties is incorporated into the model and corresponding comparable assessments. For example, the quality and condition inputs may be used in a hedonic adjustment factor model, comparable selection exclusion rules, economic distance calculations, and adjustments for differences between the subject and comparables at comparable selection stage. The comparables may be displayed in ranked order based on the calculated similarities between the properties, with indications of the quality and condition categories, to provide an overall assessment of the comparables as well as displayable indications of the underlying quality and condition categories and related information.

For example, property data corresponding to a geographical area is accessed, and a regression is performed based upon the property data. The regression models the relationship between a dependent variable, such as price, and property-characteristic explanatory variables. Preferably, these property-characteristic explanatory variables include at least one quality variable and at least one condition variable, with each of the variables being a categorical variable wherein the quality and condition are assigned to one of a manageable number of different categories.

Additionally, the model implements techniques for determining the quality and condition categories that should be assigned to any given property based upon the property data being accessed by the model. These techniques include those for resolving ambiguities and inconsistencies in the quality and condition data, so as to provide an automated determination of categories for various possible scenarios.

Exclusion rules may also be applied to refine a pool of comparable properties, before or after the adjustments for property-condition, so as to narrow the pool. The exclusion rules preferably include those based upon quality and condition categories. That is, if a comparable property has a quality and/or condition category that is different from that of the subject by more than a threshold amount then it may be excluded (or flagged) as an appropriate comparable property.

Following this, the comparable properties may also be weighted, ranked, and displayed.

The valuation model may be run independently so as to assess any set of possible comparable properties for any given subject property. Alternatively, the valuation model may be run to assess an appraisal report by showing how well the comps in the appraisal report match the subject property relative to those predicted as good comparables by the model.

In connection with the display of the ranked listing, a map image may be displayed to illustrate the geographic distribution of the subject property and the comparable properties. Thus, in addition to offering the ranked listing that indicates where among the ranking the appraiser-chosen comparables are listed, there is a concurrent display on the map image that gives an immediate indication of the location of the comparable properties.

An associated property data grid further details information about the subject and comparable properties. The grid can be sorted according to a variety of property and other characteristics, and operates in conjunction with the map image to ease review of the comparables and corresponding criteria. The grid is preferably configurable to include identification of the quality and condition categories for the subject and comparable properties.

(i) Hedonic Equation

The regression may be a hedonic regression that correlates a dependent variable to a number of property characteristic explanatory variables.

In an example hedonic equation, the dependent variable is sale price and the explanatory variables can include the physical characteristics, such as gross living area, lot size, age, number of bedrooms and or bathrooms, as well as location specific effects, time of sale specific effects, property condition effect (or a proxy thereof). The ordinarily skilled artisan will readily recognize that various different variables may be used in conjunction with the present invention.

In this example, the dependent variable is the logged sale price. The explanatory variables are:

(1) Four continuous property characteristics:
(a) log of gross living area (GLA),
(b) log of Lot Size,
(c) log of Age, and
(d) Number of Bathrooms; and
(2) Five fixed effect variables:
(a) location fixed effect (e.g., by Census Block Group (CBG));

(b) Time fixed effect (e.g., measured by 3-month periods (quarters) counting back from the estimation date);
(c) Foreclosure status fixed effect, which captures the maintenance condition and possible REO discount;
(d) Condition Category (e.g., the property is one of m different condition categories, $CC_1$ through $CC_m$); and
(e) Quality Category (e.g., the property is one of s different quality categories, $QC_1$ through $QC_s$).

The exemplary equation (Eq. 1) is as follows:

$$\ln(p) = \beta_{gla} \cdot \ln(GLA) + \beta_{lot} \cdot \ln(LOT) + \qquad (Eq.\ 1)$$
$$\beta_{age} \cdot \ln(AGE) + \beta_{bath} \cdot BATH + \sum_{i=1}^{N_{CBG}} LOC_i^{CBG} +$$
$$\sum_{j=1}^{N_{QTR}} TIME_j + \sum_{k=\{0,1\}} FCL_k + \sum_{l=\{1-m\}} CC_l + \sum_{r=\{1-s\}} QC_r + \varepsilon.$$

Although any categorization may be used for the Condition Category and Quality Category Variables, in one example they may be those implemented in a Uniform Appraisal Dataset (UAD) as implemented in the real estate industry.

Particularly, in this example the variables are described as follows. For the Condition Category variable:

$CC_1$: The improvements have been very recently constructed and have not previously been occupied. The entire structure and all components are new and the dwelling features no physical depreciation.

$CC_2$: The improvements feature no deferred maintenance, little or no physical depreciation, and require no repairs. Virtually all building components are new or have been recently repaired, refinished, or rehabilitated. All outdated components and finishes have been updated and/or replaced with components that meet current standards. Dwellings in this category either are almost new or have been recently completely renovated and are similar in condition to new construction.

$CC_3$: The improvements are well maintained and feature limited physical depreciation due to normal wear and tear. Some components, but not every major building component, may be updated or recently rehabilitated. The structure has been well maintained.

$CC_4$: The improvements feature some minor deferred maintenance and physical deterioration due to normal wear and tear. The dwelling has been adequately maintained and requires only minimal repairs to building components/mechanical systems and cosmetic repairs. All major building components have been adequately maintained and are functionally adequate.

$CC_5$: The improvements feature obvious deferred maintenance and are in need of some significant repairs. Some building components need repairs, rehabilitation, or updating. The functional utility and overall livability is somewhat diminished due to condition, but the dwelling remains useable and functional as a residence.

$CC_6$: The improvements have substantial damage or deferred maintenance with deficiencies or defects that are severe enough to affect the safety, soundness, or structural integrity of the improvements. The improvements are in need of substantial repairs and rehabilitation, including many or most major components.

For the Quality Category variable:

$QC_1$: Dwellings with this quality rating are usually unique structures that are individually designed by an architect for a specified user. Such residences typically are constructed from detailed architectural plans and specifications and feature an exceptionally high level of workmanship and exceptionally high-grade materials throughout the interior and exterior of the structure. The design features exceptionally high-quality exterior refinements and ornamentation, and exceptionally high-quality interior refinements. The workmanship, materials, and finishes throughout the dwelling are of exceptionally high quality.

$QC_2$: Dwellings with this quality rating are often custom designed for construction on an individual property owner's site. However, dwellings in this quality grade are also found in high-quality tract developments featuring residences constructed from individual plans or from highly modified or upgraded plans. The design features detailed, high quality exterior ornamentation, high-quality interior refinements, and detail. The workmanship, materials, and finishes throughout the dwelling are generally of high or very high quality.

$QC_3$: Dwellings with this quality rating are residences of higher quality built from individual or readily available designer plans in above-standard residential tract developments or on an individual property owner's site. The design includes significant exterior ornamentation and interiors that are well finished. The workmanship exceeds acceptable standards and many materials and finishes throughout the dwelling have been upgraded from "stock" standards.

$QC_4$: Dwellings with this quality rating meet or exceed the requirements of applicable building codes. Standard or modified standard building plans are utilized and the design includes adequate fenestration and some exterior ornamentation and interior refinements. Materials, workmanship, finish, and equipment are of stock or builder grade and may feature some upgrades.

$QC_5$: Dwellings with this quality rating feature economy of construction and basic functionality as main considerations. Such dwellings feature a plain design using readily available or basic floor plans featuring minimal fenestration and basic finishes with minimal exterior ornamentation and limited interior detail. These dwellings meet minimum building codes and are constructed with inexpensive, stock materials with limited refinements and upgrades.

$QC_6$: Dwellings with this quality rating are of basic quality and lower cost; some may not be suitable for year-round occupancy. Such dwellings are often built with simple plans or without plans, often utilizing the lowest quality building materials. Such dwellings are often built or expanded by persons who are professionally unskilled or possess only minimal construction skills Electrical, plumbing, and other mechanical systems and equipment may be minimal or non-existent. Older dwellings may feature one or more substandard or non-conforming additions to the original structure.

The variables and corresponding hedonic equation (Eq. 1) is provided as one preferred example. There may be various alternatives. Although CBG is used as the location fixed effect, other examples may include Census Tract or other units of geographical area. Additionally, months may be used in lieu of quarters, or other periods may be used regarding the time fixed effect.

Additionally, although the county may be used for the relatively large geographic area for which the regression analysis is performed, other areas such as a multi-county area, state, metropolitan statistical area, or others may be used. Still further, some hedonic models may omit or add different explanatory variables. For example, additional explanatory variables may relate to whether properties border geographical features having special value connotations such as bodies of water, or are close to geographical features such as schools, hospitals, bodies of water, etc.

(ii) Resolving Ambiguities and Inconsistencies

With the above-described quality and condition categorical variables, there may be a greater potential for disparate values in the accessed property data than there typically is for many of the other variables (e.g., lot size), although those variables also have instances of disparate values. That is, one resource may show quality or condition categories for a given property that are different from those identified in another resource.

According to this aspect, the quality and condition categorical data is automatically filtered to provide a trusted data set that is used in the regression. This may be variously carried out including the following factors:

(1) Adopting a trusted data resource. One source of property data may be adopted as the most reliable and preferred source of data. In this instance, where the trusted data resource for a given property includes the quality and/or condition categorical information, that information may be adopted even if less trusted resources indicate other values.

(2) Determining disparity between values. There may be instances where a number of resources include quality and condition categorical values, with one resource differing only slightly from the others. For example, a difference of only one on the numerical categorical scale. In these instances, the integer of the average value may be adopted. Outlier values (e.g., greater than 2 in difference) may be excluded.

(3) Examining how recently the data was gathered. The determination may also be made based upon how recently the data was gathered. That is, new records may be viewed as more accurate than older records.

(4) Examine alternative, automatically generated quality and condition categorical determinations that are generated from a separate regression of factors indicative of quality and condition. For example, as set forth in the next section.

These and various other factors may be used. Additionally, a rules based approach may be used to identify the most appropriate category for a given property using a hierarchy of the data resources combined with an examination of the disparity, recency and separate regression factors.

Still further, expert opinion information corresponding to quality and condition is gathered and maintained, and then used in the valuation model at various stages. This may be an accumulation of expert opinion information based upon a survey of such expert opinions corresponding to a group of properties. Numerous experts may be used, and numerous properties may be evaluated accordingly. For example, the experts may be asked to score each of the properties according to quality and condition, consistent with however the variables are defined, such as in the examples described above.

The expert opinion information is then used in the processes to resolve inconsistencies or ambiguities above, used to assess the impact of the quality and condition variables in conjunction with the regression, and/or used to assess the quality and condition determinations found within individual appraisal reports.

(iii) Alternative of Separate Regression(s) to Isolate Quality and Condition Variables from Non-Categorical Factors.

In the first-described approach as set forth in the preceding section, the quality and condition categories are determined based upon available data (with resolution of ambiguities or inconsistencies as desired), and then used in a regression that determines the contribution of each variable, including the quality and condition components as well as the other hedonic variables as listed.

As an alternative, the quality and condition categorical variables may also be automatically determined using a separate regression according to factors that are not direct categories, but which are determined to evidence quality or condition. For example, factors such as a year built category, remarks associated to the property in real estate listings, the number of photos included in real estate listings, and others may be used to derive quality and condition information, which in turn is used to create a condition index of (e.g., six) categories from best to worst based on certain threshold values, which are then used to determine the appropriate categories for any given property.

In one example, the distribution of predicated values is bucketed for categorization as follows. Assume that p1, p10, p30, p70, p99 are the 1st, 10th, 30th, 70th, 99th percentiles.

Then if the predicted value from the quality or condition regression <=p1, Condition Category=C6;

if p1<the predicted value from the quality or condition regression <=p10, Condition Category=C5;

if p10<the predicted value from the quality or condition regression <=p30, Condition Category=C4;

if p30<the predicted value from the quality or condition regression <=p70, Condition Category=C3;

if p70<the predicted value from the quality or condition regression <=p99, Condition Category=C2; and if the predicted value from the quality or condition regression >p99, Condition Category=C1

This is but one example, as the correspondence of the categories to the predicted values may vary in a multitude of different ways.

(iv) Exclusion Rules

Comparable selection rules may also be used to narrow the pool of comps to exclude the properties which are determined to be insufficiently similar to the subject for reasons separate from the contributions as determined from the above-described regressions. The exclusion rules should be considered optional and will depend upon the implementation.

A comparable property should be located in a relative vicinity of the subject and should be sold relatively recently; it should also be of similar size and age and sit on a commensurate parcel of land. The "N" comparables that pass through the exclusion rules are used for further analysis and value prediction.

For example, the following rules may be used to exclude comparables pursuant to narrowing the pool:

(1) Property Condition: If the condition category differs from the comp condition by a threshold number then the comp is eliminated from the comp pool. In one embodiment, differing by 2 or more categories in the index results in elimination from the comp pool. In another embodiment, differing by 3 or more categories in the index results in elimination from the comp pool. Additionally, with the above-described example, any property that is designated as $CC_6$ may be deemed only comparable to other properties of the same designation.

(2) Property Quality: Similarly, if the quality category differs from the comp condition by a threshold number then the comp is eliminated from the comp pool. In one embodiment, differing by 2 or more categories in the index results in elimination from the comp pool. In another embodiment, differing by 3 or more categories in the index results in elimination from the comp pool. Additionally, with the above-described example, any property that is designated as $QC_6$ may be deemed only comparable to other properties of the same designation.

(3) Neighborhood: comps must be located in the Census Tract of the subject and its immediate neighboring tracts;

(4) Time: comps must be sales within twelve months of the effective date of appraisal or sale;

(5) GLA must be within a defined range, for example:

$$\frac{2}{3} \leq \frac{GLA_S}{GLA_C} \leq \frac{3}{2}$$

(6) Age similarity may be determined according to the following Table 1:

TABLE 1

| Subject Age | 0-2 | 3-5 | 6-10 | 11-20 | 21-40 | 41-65 | 65+ |
|---|---|---|---|---|---|---|---|
| Acceptable Comp Age | 0-5 | 0-10 | 2-20 | 5-40 | 11-65 | 15-80 | 45+ |

(6) Lot size similarity may be determined according to the following Table 2:

TABLE 2

| Subject Lot size | <2000 sqft | 2000-4000 sqft | 4000 sqft-3 acres | >3 acres |
|---|---|---|---|---|
| Acceptable Comp Lot | 1-4000 sqft | 1-8000 sqft | $\frac{2}{5} \leq \frac{LOT_s}{LOT_c} \leq \frac{5}{2}$ | >1 acre |

These exclusion rules are provided by way of example. There may be a set of exclusion rules that add variables, that omit one or more the described variables, or that use different thresholds or ranges.

(v) Adjustment of Comps

Given the pool of comps to be analyzed by the model, the sale price of each comp may then be adjusted to reflect the difference between a given comp and the subject in each of the characteristics used in the regressions.

For example, individual adjustments are given by the following set of equations (2):

$$A_{gla}=\exp[(\ln(GLA_S)-\ln(GLA_C))\cdot \beta_{gla}];$$

$$A_{lot}=\exp[(\ln(LOT_S)-\ln(LOT_C))\cdot \beta_{lot}];$$

$$A_{age}=\exp[(\ln(AGE_S)-\ln(AGE_C))\cdot \beta_{age}];$$

$$A_{bath}=\exp[(BATH_S-BATH_C)\cdot \beta_{age}];$$

$$A_{loc}=\exp[LOC_S-LOC_C];$$

$$A_{time}=\exp[TIME_S-TIME_C];$$

$$A_{fcl}=\exp[FCL_S-FCL_C];$$

$$A_{qc}=\exp[QC_S-QC_C]; \text{ and}$$

$$A_{cc}=\exp[CC_S-CC_C], \qquad \text{(Eq. 2)}$$

where coefficients βgla, βlot, βage, βbath, LOC, TIME, FCL, QC and CC are obtained from the hedonic price equation described above.

(vi) Weighting of Comps and Value Prediction

Because of unknown neighborhood boundaries and potentially missing data, the pool of comparables will likely include more than are necessary for the best value prediction in most markets. The adjustments described above can be quite large given the differences between the subject property and comparable properties. Accordingly, rank ordering and weighting are also useful for the purpose of value prediction.

The economic distance $D_{eco}$ between the subject property and a given comp may be described as a function of the differences between them as measured in dollar value for a variety of characteristics, according to the adjustment factors described above.

Specifically, the economic distance may be defined as a Euclidean norm of individual percent adjustments for all characteristics used in the hedonic equation:

$$D_{SC}^{eco} = \sqrt{\sum_{i \in \{gla, lot, age, bath, loc, time, fcl, qc, cc\}} (A_i - 1)^2} \qquad \text{(Eq. 3)}$$

The comps are then weighted. Properties more similar to the subject in terms of physical characteristics, location, and time of sale are presumed better comparables and thus are preferably accorded more weight in the prediction of the subject property value. Accordingly, the weight of a comp may be defined as a function inversely proportional to the economic distance, geographic distance and the age of sale.

For example, comp weight may be defined as:

$$w_C = \frac{1}{D_{SC}^{eco} \cdot D_{SC}^{geo} \cdot dT_{SC}} \qquad \text{(Eq. 4)}$$

where $D_{geo}$ is a measure of a geographic distance between the comp and the subject, defined as a piece-wise function:

$$D_{SC}^{geo} = \begin{cases} 0.1 & \text{if } d_{SC} < 0.1 \text{ mi} \\ d_{SC} & \text{if } 0.1 \text{ mi} \le d_{SC} \le 1.0 \text{ mi} \\ 1.0 + \sqrt{d_{SC} - 1.0} & \text{if } d_{SC} > 1.0 \text{ mi} \end{cases} \qquad \text{(Eq. 5)}$$

and dT is a down-weighting age of comp sale factor $$dT_{SC} = \begin{cases} 1.00 & \text{if } (0, 90] \text{ days} \\ 1.25 & \text{if } (90, 180] \text{ days} \\ 2.00 & \text{if } (180, 270] \text{ days} \\ 2.50 & \text{if } (270, 365] \text{ days} \end{cases} \qquad \text{(Eq. 6)}$$

Comps with higher weight receive higher rank and consequently contribute more value to the final prediction, since the predicted value of the subject property based on comparable sales model is given by the weighted average of the adjusted price of all comps:

$$\hat{p}_S = \frac{\sum_{C=1}^{N_{COMPS}} w_C \cdot p_C^{adj}}{\sum_{C=1}^{N_{COMPS}} w_C} \qquad \text{(Eq. 7)}$$

As can be seen from the above, the separate weighting following the determination of the adjustment factors allows added flexibility in prescribing what constitutes a good comparable property. Thus, for example, policy factors such as those for age of sale data or location may be separately instituted in the weighting process. Although one example is illustrated it should be understood that the artisan will be free to design the weighting and other factors as necessary.

(vii) Property Condition Adjustments

The previously described adjustments are made for the various property characteristics. An adjustment is also made based upon the property condition index. Preferably, after obtaining an estimated sale price from comp sales model, the difference between the actual and predicted price is regressed on the predicted condition index to obtain a price for each of the condition categories. Then based on these coefficients, and the difference between the subject and comp condition, an adjustment is made to the predicted sale price of the subject.

As an alternative it is possible to regress log price on property characteristics and predicted condition indices in the hedonic regression. However, this may not be viewed as desirable because the residuals from the hedonic regression were used to predict the condition. In any event, this approach may be more defendable when are operating out of sample.

It should also be noted that an appraisal may be reviewed to determine the propriety of a property condition adjustment. There, the system may review the comparables that appraisers selected, and compare those with the model selected comparables pool. If, in some appraisals, an appraiser has made a big adjustment based on condition or picked rather expensive comps to justify the subject's price, the predicted condition index can be used to determine whether the selected comparable(s) were appropriate.

(viii) Listing and Mapping of Comparable Properties

The comparable properties may then be listed according to the weighting, or a ranking from the highest weighted comparable property to the lowest. This listing may be variously limited to accommodate listing them within a display area. For example, a default setting might be 20 comparable properties. The list of comparable properties includes, of course, the model-chosen comparable properties. They may also include appraiser-chosen comparables.

According to another aspect, mapping and analytical tools that implement the comparable model are provided. Mapping features allow the subject property and comparable properties to be concurrently displayed. Additionally, a table or grid of data for the subject properties is concurrently displayable so that the list of comparables can be manipulated, with the indicators on the map image updating accordingly.

For example, mapping features include the capability to display the boundaries of census units, school attendance zones, neighborhoods, as well as statistical information such as median home values, average home age, etc.

The grid/table view allows the user to sort the list of comparables on rank, value, size, age, or any other dimension. Additionally, the rows in the table are connected to the full database entry as well as sale history for the respective property. Combined with the map view and the neighborhood statistics, this allows for a convenient yet comprehensive interactive analysis of comparable sales.

With further reference to the figures, examples of environments and particular embodiments implementing an AVM that automatically adjusts for property condition.

Figure 1A:
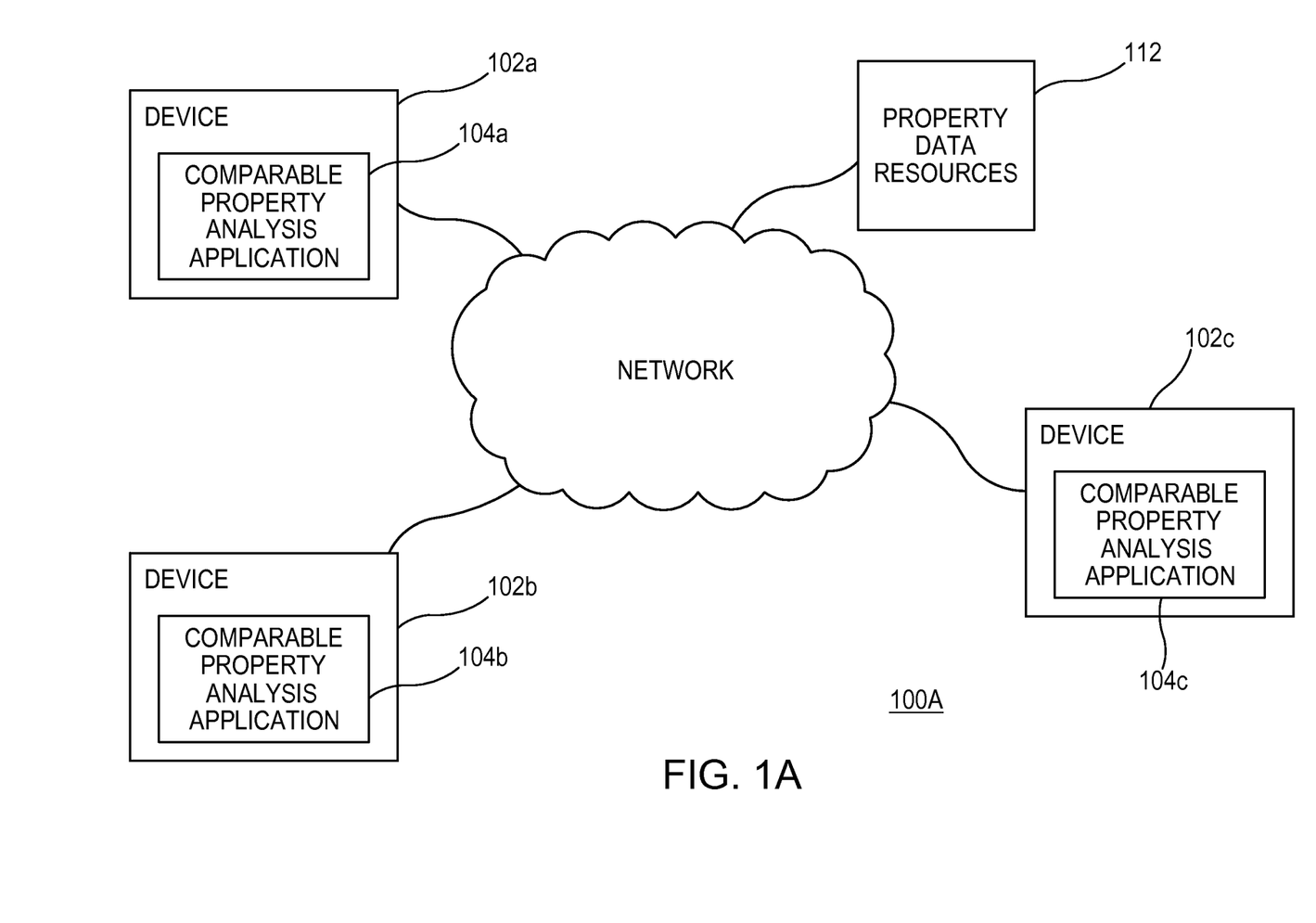
FIGS. 1A-B are block diagrams illustrating examples of systems with a comparable property analysis application that uses property characteristics variables that include categorical condition and quality variables.
Figure 1B:
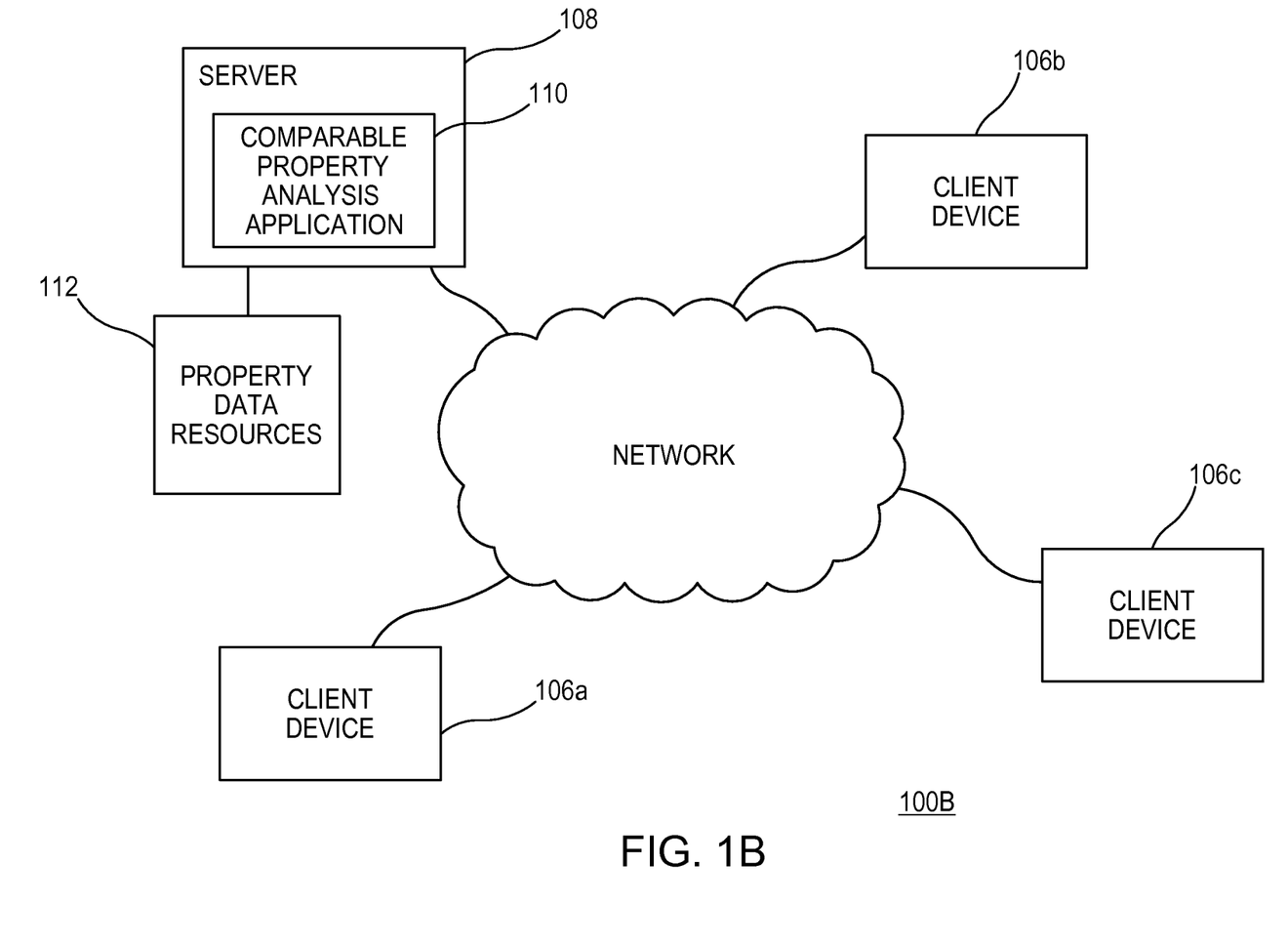

FIGS. 1A-B are block diagrams illustrating examples of systems 100A-B in which a comparable property analysis application operates.

FIG. 1A illustrates several user devices 102a-c each having a comparable property analysis application 104a-c.

The user devices 102a-d are preferably computer devices, which may be referred to as workstations, although they may be any conventional computing device. The network over which the devices 102a-d may communicate may also implement any conventional technology, including but not limited to cellular, WiFi, WLAN, LAN, or combinations thereof.

In one embodiment, the comparable property analysis application 104a-c is an application that is installed on the user device 102a-c. For example, the user device 102a-c may be configured with a web browser application, with the application configured to run in the context of the functionality of the browser application. This configuration may also implement a network architecture wherein the comparable property analysis applications 104a-c provide, share and rely upon the comparable property analysis application 104a-c functionality. The devices 102a-d are configured with a processor and a memory for storing program code for the application. The program code is executable by the processor to perform the automated valuation functionality described herein.

As an alternative, as illustrated in FIG. 1B, the computing devices 106a-c may respectively access a server 108, such as through conventional web browsing, with the server 108 providing the comparable property analysis application 110 for access by the client computing devices 106a-c. As another alternative, the functionality may be divided between the computing devices and server. Finally, of course, a single computing device may be independent configured to include the comparable property analysis application.

As illustrated in FIGS. 1A-B, property data resources 112 are typically accessed externally for use by the comparable property analysis application, since the amount of property data is voluminous, and since the application is configured to allow access to any county or local area in a very large geographical area (e.g., for an entire country such as the United States). Additionally, the property data resources 112 are shown as a singular block in the figure, but it should be understood that a variety of resources, including company-internal collected information (e.g., as collected by Fannie Mae), as well as external resources, whether resources where property data is typically found (e.g., MLS, tax, etc.), or resources compiled by an information services provider (e.g., Lexis).

The comparable property analysis application accesses and retrieves the property data from these resources in support of the modeling of comparable properties as well as the rendering of map images of subject properties and corresponding comparable properties, and the display of supportive data (e.g., in grid form) in association with the map images.

Figure 2:
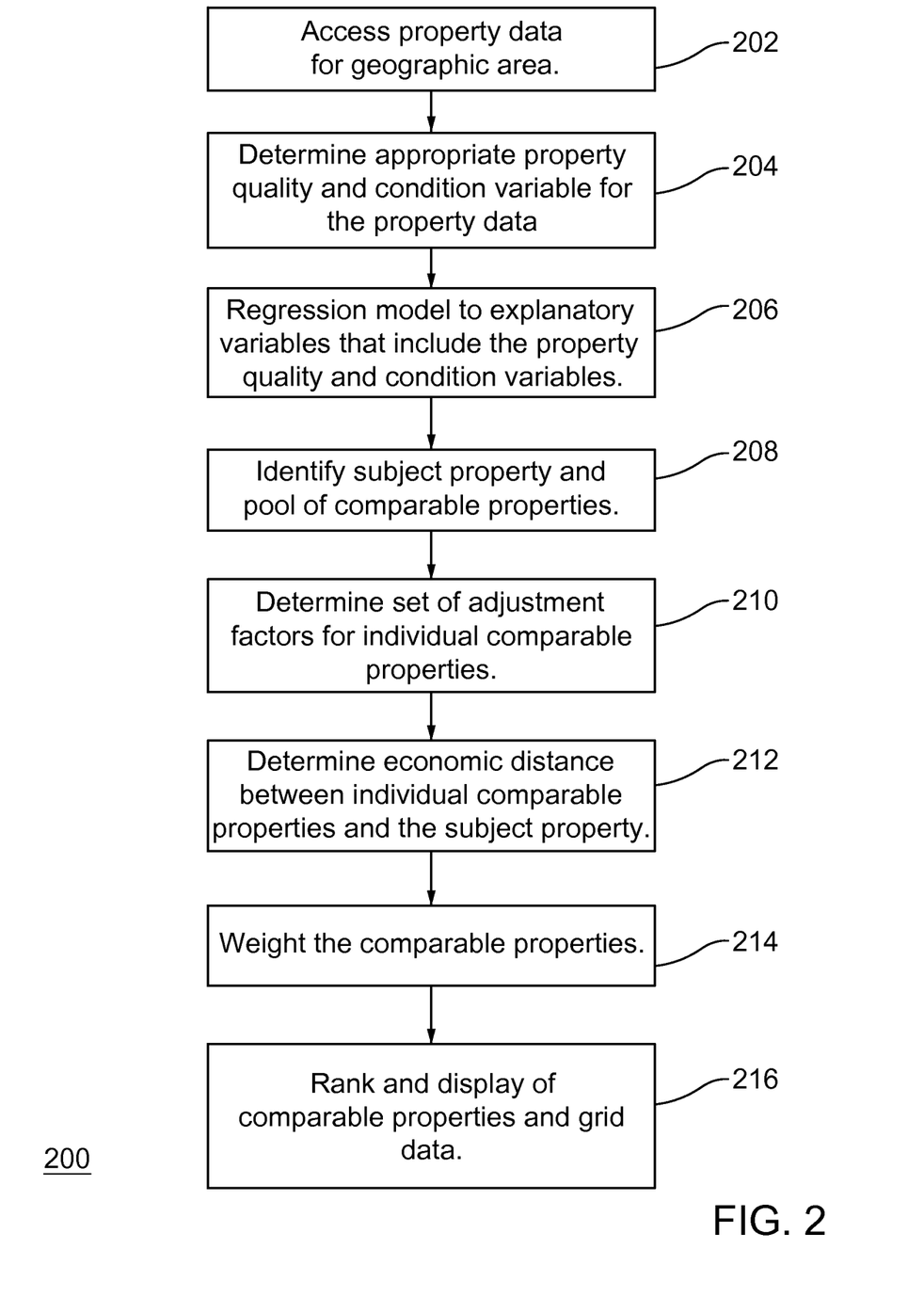
FIG. 2 is a flow diagram illustrating an example of a process for modeling comparable properties using property characteristic variables that include categorical condition and quality variables.

FIG. 2 is a flow diagram illustrating an example of a process 200 for modeling comparable properties using property characteristic variables that include categorical condition and quality variables.

As has been described, the application accesses 202 property data. This is preferably tailored at a geographical area of interest in which a subject property is located (e.g., county).

The appropriate property quality and condition variables are determined 204 for the property data. As described previously, the property data may be constituted from a variety of data sources, which may include property data databases as well as supplemental information such as may be accumulated from appraisal reports, real estate transactions, tax records, etc. The regression will implement a number of specific property characteristic variables, including the quality and condition variables. Preferably, techniques are implemented to reconcile any ambiguities or inconsistencies among the property data for the property characteristic variables. The reconciliation factors may include, for example, (1) identification of trusted sources or building of hierarchical source prioritization, (2) data elimination and averaging techniques (3) examination of data recency; and/or (4) separate regression on factors that are determined to evidence quality or condition.

A regression 206 modeling the relationship between price and explanatory variables is then performed on the accessed data. Preferably, the explanatory variables include a variety of property characteristic variables that further include quality and condition categorical variables. One example of the categorization (six of each for the quality and condition variables) is described above.

A subject property within the geographic area of interest is identified 208 as is a pool of comparable properties. As described, the subject property may be initially identified, which dictates the selection and access to the appropriate (e.g., county level) data. Alternatively, a user may be reviewing several subject properties within a county, in which case the county data will have been accessed, and new selections of subject properties prompt new determinations of the pool of comparable properties for each particular subject property.

The pool of comparable properties may be initially defined or refined using exclusion rules. This limits the unwieldy number of comparables that would likely be present if the entire county level data were included in the modeling of the comparables.

A set of adjustment factors is determined 210 for each comparable property in the pool. The adjustment factors may be a numerical representation of the price contribution of each of the explanatory variables, as determined from the difference between the subject property and the comparable property for a given explanatory variable. An example of the equations for determining these individual adjustments has been provided above.

Once these adjustment factors have been determined 210, the economic distance between the subject property and respective individual comparable properties may also be determined 212. The economic distance is preferably constituted as a quantified value representative of the estimated price difference between the two properties as determined from the set of adjustment factors for each of the explanatory variables, including property quality and condition.

Following determining of the economic distance, the comparable properties are weighted 214 in support of generating a ranking of the comparable properties according to the model. A preferred weighting, described previously, entails a function inversely proportional to the economic distance, geographic distance and age of transaction (typically sale) of the comparable property from the subject property.

The weights may further be used to calculate an estimated price of the subject property comprising a weighted average of the adjusted price of all of the comparable properties.

Once the model has performed the regression, adjustments and weighting of comparables, a display is rendered 216 to convey the comparable analysis results, preferably in the form of grid and map image displays to allow convenient and comprehensive review and analysis of the set of comparables. The grid, preferably, offers a ranked listing of the comparable properties. In the instance where an appraisal report is being reviewed, the properties listed as comparable in the appraisal report are displayed and ranked within the overall listing of comparables as determined by the model.

Figure 3:
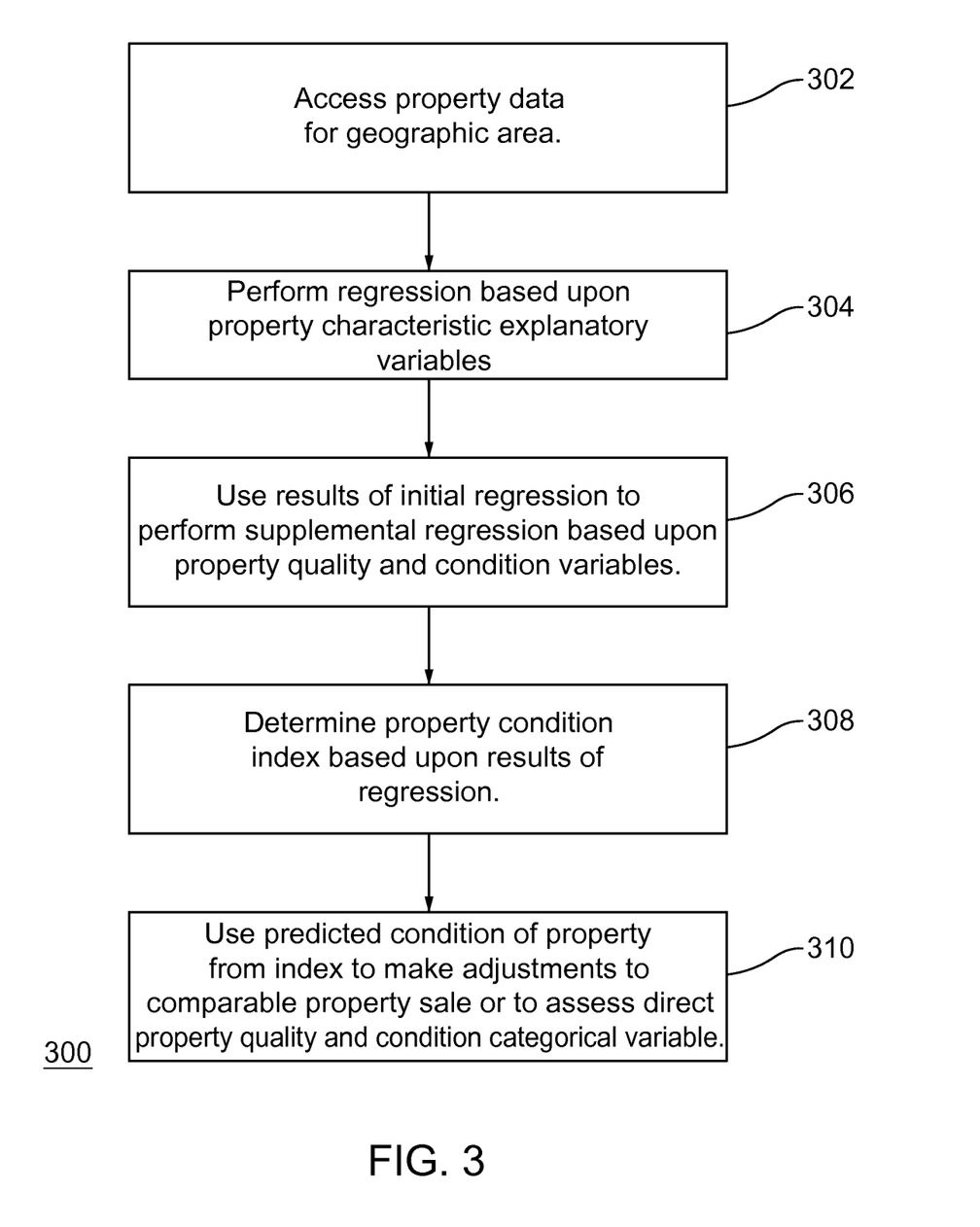
FIG. 3 is a flow diagram illustrating an example of a process for using a supplemental regression to create a property quality and condition index.

FIG. 3 is a flow diagram illustrating an example of a process 300 for using a supplemental regression to create a property quality and condition index.

Property data for a geographical area of interest is accessed 302 and regression 304 is performed based upon the property data, which includes property-characteristic explanatory variables. The property data may or may not include the property quality and condition variables at this time. In the case where it does not, the supplemental regression described below is performed to develop such variables. In the case where it does, the supplemental regression described below may be performed to either supplement the existing quality and condition variables, or to provide a basis of comparison that might be used to reconcile or correct the property quality and condition variables.

As indicated, this supplemental regression is then performed 306 based upon the results of the initial regression. This further regression models or further explains the relationship between the dependent variable and property quality and condition explanatory variables. Specifically, further regression may model the relationship between the residual from the first regression and property-condition variables that are used to provide an indirect indication of quality or condition. This portion of the regression models the relationship of the dependent variable to property-condition variables.

The property-condition variables preferably include a categorical variable that depends upon the presence or absence of both value enhancing and value reducing remarks in associated property listings. Additional property-condition variables include a categorical year-built variable, and one based upon the number of photos in the associated property listings.

The regression modeling the relationship to the property-characteristic variables is then used to either (1) determine a property condition index pertinent to the geographic area. The index provides a predicted condition for a given property that is used 310 to make value adjustments to the property sale, or to (2) assess the directly input property quality and condition categorical variables. In the first instance, the supplemental regression acts as the source of the property quality and condition categorical variables, in the second instance, the supplemental regression assists in the reconciliation of the property data to determine the correct categories of quality and condition.

In a fashion similar to that described regarding FIG. 2, following this, the comparable properties can be weighted, ranked, and displayed accordingly.

Figure 4:
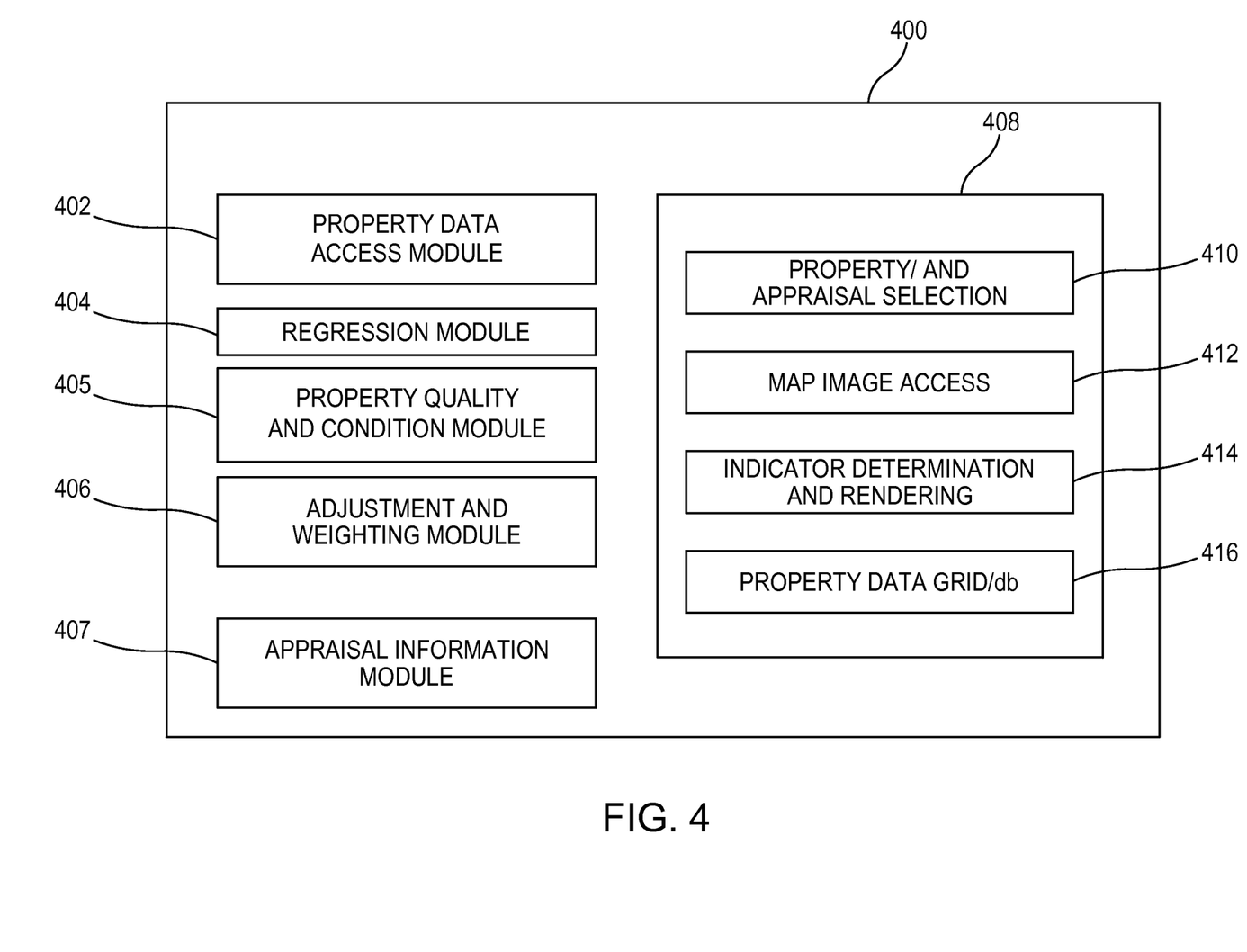
FIG. 4 is a block diagram illustrating an example of a comparable property analysis application that uses property characteristics variables that include categorical condition and quality variables.

FIG. 4 is a block diagram illustrating an example of a comparable property analysis application 400 incorporating an automated appraisal model for assessing comparable properties, which uses categorical condition and quality variables. The application 400 preferably comprises program code that is stored on a non-transitory computer readable medium (e.g., compact disk, hard disk, etc.) and that is executable by a processor to perform the operations to automatically model comparable properties.

According to one aspect, the application 400 includes program code executable to perform operations of accessing property data corresponding to a geographical area, performing the regression, identifying comparable properties, performing value adjustments, and weighting the comparable properties as described above.

The application 400 includes program code executable to perform operations of accessing property data corresponding to a geographical area, and performing a first regression based upon the property data, the first regression modeling the relationship between a dependent variable and property-characteristic explanatory variables. A further regression implements the results of the first regression and models the relationship between the dependent variable and one or more property-condition explanatory variables, and the property condition index is determined for the geographical area based upon results of the second regression.

The application 400 also includes program code for displaying a map image corresponding to the geographical area, and displaying indicators on the map image indicative of the subject property and at least one of the plurality of comparable properties, as well as ranking the plurality of comparable properties based upon the weighting, and displaying a text listing of the plurality of comparable properties according to the ranking.

The comparable property analysis application 400 is preferably provided as software, but may alternatively be provided as hardware or firmware, or any combination of software, hardware and/or firmware. The application 400 is configured to provide the comparable property modeling, appraisal results comparing and corresponding mapping functionality described herein. Although one modular breakdown of the application 400 is offered, it should be understood that the same functionality may be provided using fewer, greater or differently named modules.

The example of the comparable property analysis application 400 of FIG. 4 includes a property data access module 402, regression module 404, a property quality and condition module 405, an adjustment and weighting module 406, appraisal information module 407, and UI module 408, with the UI module 408 further including a property and appraisal selection module 410, map image access module 412, indicator determining and rendering module 414 and property data grid/DB module 416.

The property data access module 402 includes program code for carrying access and management of the property data, whether from internal or external resources. The regression module 404 includes program code for carrying out the regression upon the accessed property data, according to the regression algorithm described above, and produces corresponding results such as the determination of regression coefficients and other data at the country (or other) level as appropriate for a subject property. In particular, the regression module 404 implements both a regression involving property characteristics that include the quality and condition categorical variables.

The property quality and condition module 405 is configured to retain the property quality and condition categorical variables, and also includes program code executable to determine the quality and condition categorical variables, includes reconciliation processes where the property data contains various instances of quality and condition information.

The adjustment and weighting module 406 is configured to apply the exclusion rules, and to calculate the set of adjustment factors for the individual comparables, the economic distance, and the weighting of the comparables.

The appraisal information module 407 may be a stand-alone database or may organize access to a variety of external databases of appraisal information. The appraisal information is typically in the form of appraisal reports for subject properties, wherein a set of comparable properties chosen by an appraiser is listed. The appraisal information may be retrieved based upon a variety of criteria, including search by subject property, identification number, or characteristics (appraiser ID, vendor, date, etc.).

The UI module 408 manages the display and receipt of information to provide the described functionality. It includes a property and appraisal selection module 410, to manage the interfaces and input used to identify one or more subject properties and corresponding appraisal information. The map image access module 412 accesses mapping functions and manages the depiction of the map images as well as the indicators of the subject property and the comparable properties. The indicator determination and rendering module 414 is configured to manage which indicators should be indicated on the map image depending upon the current map image, the weighted ranking of the comparables and predetermined settings or user input. The property data grid/DB 416 manages the data set corresponding to a current session, including the subject property and pool of comparable properties. It is configured as a database that allows the property data for the properties to be displayed in a tabular or grid format, with various sorting according to the property characteristics, economic distance, geographical distance, time, etc.

Figure 5A:
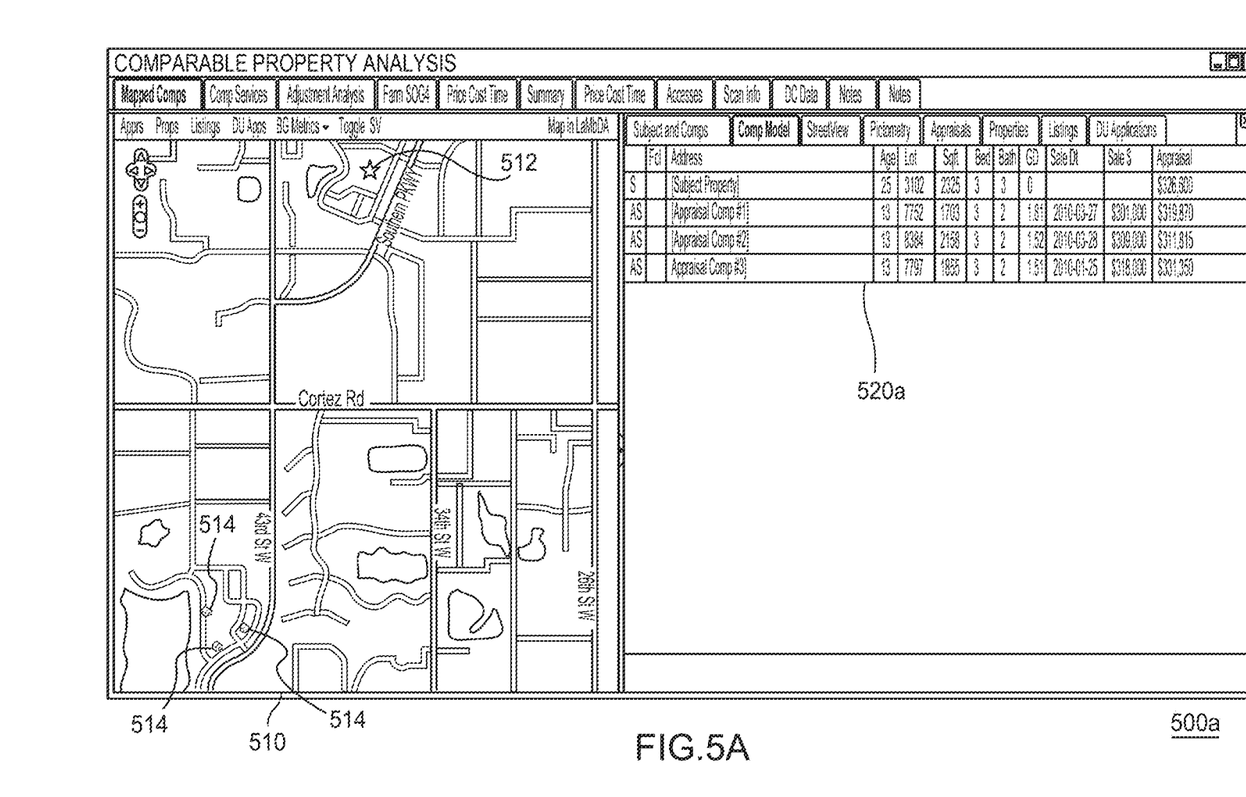
FIG. 5A is a display diagram illustrating an example of a map image and corresponding property grid data for a list of appraiser-chosen comparable properties.
Figure 5B:
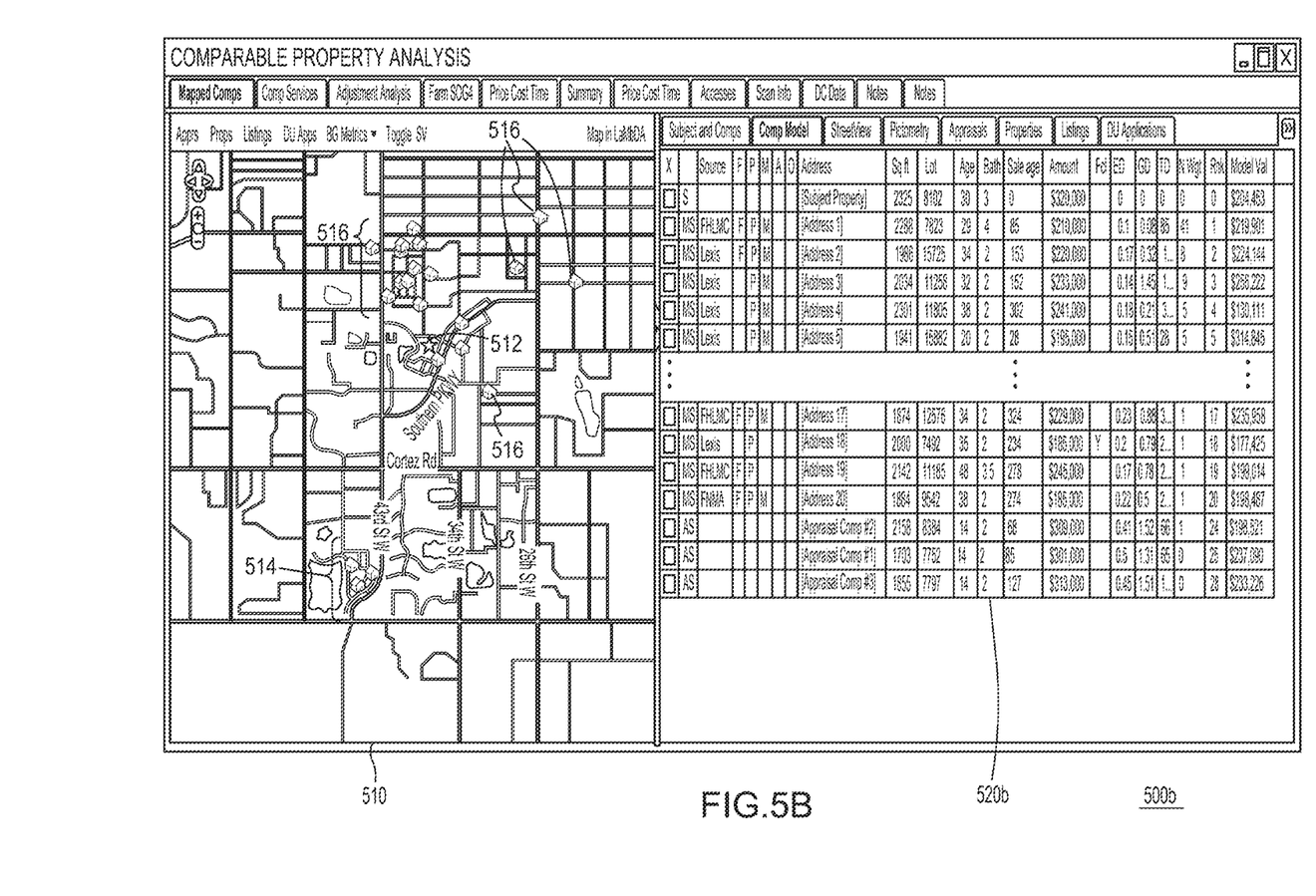
FIG. 5B is a display diagram illustrating an example of a map image and property grid data updated to indicate appraiser-chosen comparable properties among a listing of model-chosen comparable properties.

FIG. 5A is a display diagram illustrating an example of a map image 510a and corresponding property grid data 520a for a list of appraiser-chosen comparable properties, and FIG. 5B is a display diagram illustrating an example of a map image 510a and property grid data 520b updated to indicate appraiser-chosen comparable properties among a ranked listing of model-chosen comparable properties.

The map image 510a-b depicts a region that can be manipulated to show a larger or smaller area, or moved to shift the center of the map image, in convention fashion. This allows the user to review the location of the subject property 512 and corresponding comps 514, 516 at any desired level of granularity. This map image 510a-b may be separately viewed on a full screen, or may be illustrated alongside the property data grid 520a-b as shown.

The property grid data 520a-b contains a listing of details about the subject property and the comparable properties, as well as various information fields. The fields include an identifier field (e.g., "S" indicates the subject property, "AS" indicates an appraiser-chosen comparable property, and "MS" indicates a model-chosen comparable property), the source of data for the property ("Source"), the address of the property ("Address"), the square footage ("Sq Ft"), the lot size ("Lot"), the age of the property ("Age"), the number of bathrooms ("Bath"), the age of the prior sale ("Sale Age"), the prior sale amount ("Amount"), the foreclosure status ("FCL", y/n), the economic distance ("ED"), geographic distance ("GD") and time distance ("TD", e.g., as measured in days) factors as described above, the weight ("N. Wgt"), the ranking by weight ("Rnk"), and the valuation as determined from the comparable sales model ("Model Val").

Initially, a user may navigate through an appraisal selection screen that allows the user to identify and select an appraisal report for a subject property. Once this report is selected, the map image 510a-b and property grid data 520a-b may be prompted accordingly, such that the subject property and the appraiser-chosen comparable properties are listed and displayed.

For example, FIG. 5A illustrates an example of a display screen 500a that concurrently displays a map image 510a and a corresponding property data grid 520a once an appraisal report for a subject property has been selected. As indicated in the property grid data, the listing identified as "S" is the subject property, and the listings identified as "AS" indicate appraiser-chosen comparable properties. The subject property 512 and appraiser-chosen comparable properties 514 are indicated in the map image as well.

The updated display screen 500b of FIG. 5B may be displayed following execution of the comparable property model, which identifies the comparable properties, determines adjustment factors, determines economic distance and weights the comparable properties, such as described above. At this point, the map image 510b is updated to include not only the subject property 512 and appraiser-chosen comparable properties 514, but also the model-chosen properties 516 that were not in the appraisal report. Similarly, the property data grid 520b updates to include the model-chosen properties that were not in the appraisal report ("MS"). As illustrated, here, the model ranked the appraiser-chosen comparables as $24^{th}$, $25^{th}$ and $26^{th}$ among the properties it determined to be appropriate comparables. The listing also indicates the top 20 model-chosen comparable properties. Additionally, the map image 510b indicates that the appraiser-chosen comparable properties 514 are further geographically from the subject property than are many of the model-chosen properties 516.

Further assessment of the data can be variously undertaken by the user. The map image 510 also allows the user to place a cursor over any of the illustrated properties to prompt highlighting of information for that property and other information. Additionally, the listing of comparables in the property grid data 520 can be updated according to any of the listed columns. The grid data can be variously sorted to allow the user to review how the subject property compares to the listed comparable properties.

Still further, the map image 510 can be divided into regions to help further assess the location of the subject property and corresponding properties. For example, the map image can be updated to indicate several Census Block Group (CBG) regions in the map image, along with trend or other data particular to each CBG. This helps the user to further assess how the subject property relates to the comparable properties, with the CBG acting as a proxy for neighborhood. By way of example, the map image 510 of FIG. 5B illustrates several CBG separated by darker lines. As can be seen many of the most higher ranked model-chosen properties 516 reside in the same CBG as the subject property, whereas the appraiser-chosen comparable properties 514 reside in a different, distant CBG. Still further, the map image 510 indicates proximity of the appraiser-chosen comparable properties 514 to an important value-affecting feature (a lake) whereas the subject property and the closest model-chosen comparable properties are resident relatively distant from the important feature. This visual comparison concurrent with the presentation of the raw data in the grid allows a powerful and efficient assessment of the comparable properties.

The user may variously update the map image and manipulate the property data grid in order to review and assess and subject property and the corresponding comparable properties in a fashion that is both flexible and comprehensive.

Thus embodiments of the present invention produce and provide indexing and adjusting for property condition in an automated valuation model. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for assessing comparable properties with an automated valuation model, the method comprising:
   retrieving from property data resources, by a computing device after the computing device is electrically connected over a distributed network to the property data resources, property data that pertains to a pool of properties in a geographical area;
   excluding from the property data, by the computing device after the computing device retrieves the property data from the property data resources, data pertaining to a candidate property when a physical condition of the candidate property differs from a predetermined condition category or when a quality category for the candidate property differs from a predetermined quality category;
   performing, by the computing device after the computing device excludes the data pertaining to the candidate property from the property data, a regression on the property data to obtain an estimated value of a subject property in the geographical area and an estimated value of a comparable property in the geographical area;
   generating on a display screen, by the computing device after the computing device performs the regression on the property data, a graphical user interface that includes a map of the geographical area and that presents information from the property data as alphanumeric characters;
   generating on the graphical user interface, by the computing device, an icon on the map at a location that represents where one of the properties in the geographical area is sited;
   highlighting, by the computing device, the alphanumeric characters when a user places a cursor over the icon; and
   sorting, by the computing device, in a manner that repositions the alphanumeric characters on the graphical user interface.

2. The method of claim 1, wherein during performing the regression on the property data, the computing device performs a hedonic regression on the property data.

3. The method of claim 1, wherein the alphanumeric characters list the estimated value of the subject property and the estimated value of the comparable property along with information that pertains to the subject property and the comparable property.

4. The method of claim 1, wherein the map and the properties in the geographical area are displayed on the display screen concurrently with the alphanumeric characters.

5. The method of claim 1, wherein the map and the properties in the geographical area are displayed on the display screen nonconcurrently with the alphanumeric characters.

6. The method of claim 1, wherein the map illustrates a geographic distribution of the properties in the geographical area.

7. The method of claim 1, wherein the comparable property on the map differs in appearance from the subject property on the map.

8. The method of claim 1, wherein the display screen displays the subject property on the map simultaneously with the comparable property on the map.

9. A non-transitory computer readable medium storing program code for assessing comparable properties with an automated valuation model, the program code is executable by the computing device to perform the method of claim 1.

10. An apparatus for assessing comparable properties with an automated valuation model, the apparatus comprising:
    a computing device is configured to:
       retrieve, from property data resources after the computing device is electrically connected over a distributed network to the property data resources, property data that pertains to a pool of properties in a geographical area;
       exclude, from the property data resources after the computing device retrieves the property data from the property data resources, data pertaining to a candidate property when a physical condition of the candidate property differs from a predetermined condition category or when a quality category for the candidate property differs from a predetermined quality category;
       perform, after the computing device excludes the data pertaining to the candidate property, a regression on the property data to obtain an estimated value of a subject property in the geographical area and an estimated value of a comparable property in the geographical area;
       generate on a display screen, after the computing device performs the regression on the property data, a graphical user interface that includes a map of the geographical area and that presents information from the property data as alphanumeric characters;
       generates on the graphical user interface, an icon on the map at a location that represents where one of the properties in the geographical area is sited;
       highlight the alphanumeric characters when a user places a cursor over the icon; and
       sort in a manner that repositions the alphanumeric characters on the graphical user interface.

11. The apparatus of claim 10, wherein during performing the regression on the property data, the computing device performs a hedonic regression on the property data.

12. The apparatus of claim 10, wherein the alphanumeric characters list the estimated value of the subject property and the estimated value of the comparable property along with information that pertains to the subject property and the comparable property.

13. The apparatus of claim 10, wherein the map and the properties in the geographical area are displayed on the display screen concurrently with the alphanumeric characters.

14. The apparatus of claim 10, wherein the map and the properties in the geographical area are displayed on the display screen nonconcurrently with the alphanumeric characters.

15. The apparatus of claim 10, wherein the map illustrates a geographic distribution of the properties in the geographical area.

16. The apparatus of claim 10, wherein the comparable property on the map differs in appearance from the subject property on the map.

17. The apparatus of claim 10, wherein the display screen displays the subject property on the map simultaneously with the comparable property on the map.

* * * * *